Oct. 9, 1928.
G. W. LANGFORD
1,687,219
BALING PRESS
Filed April 5, 1923    2 Sheets-Sheet 2
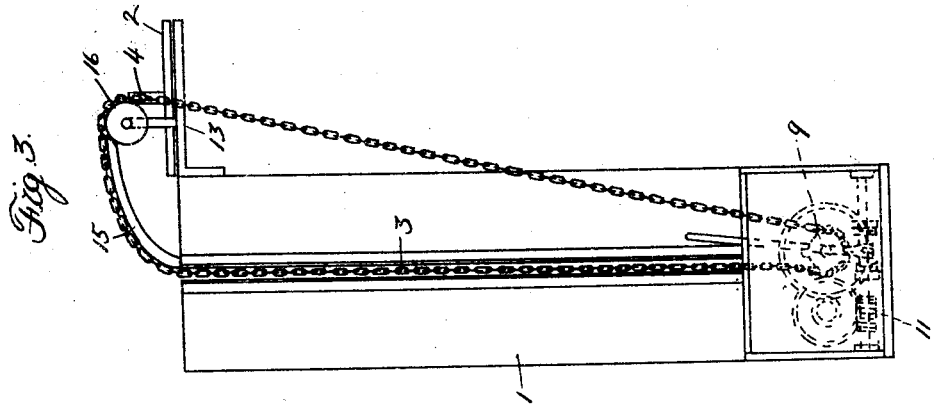
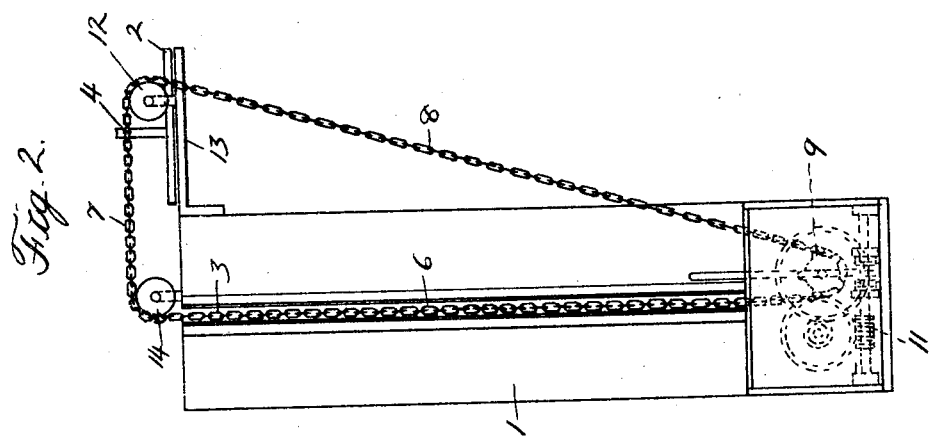
Inventor
George W. Langford
By Whittemore Hulbert Whittemore
+Belknap    Attorney Patented Oct. 9, 1928.

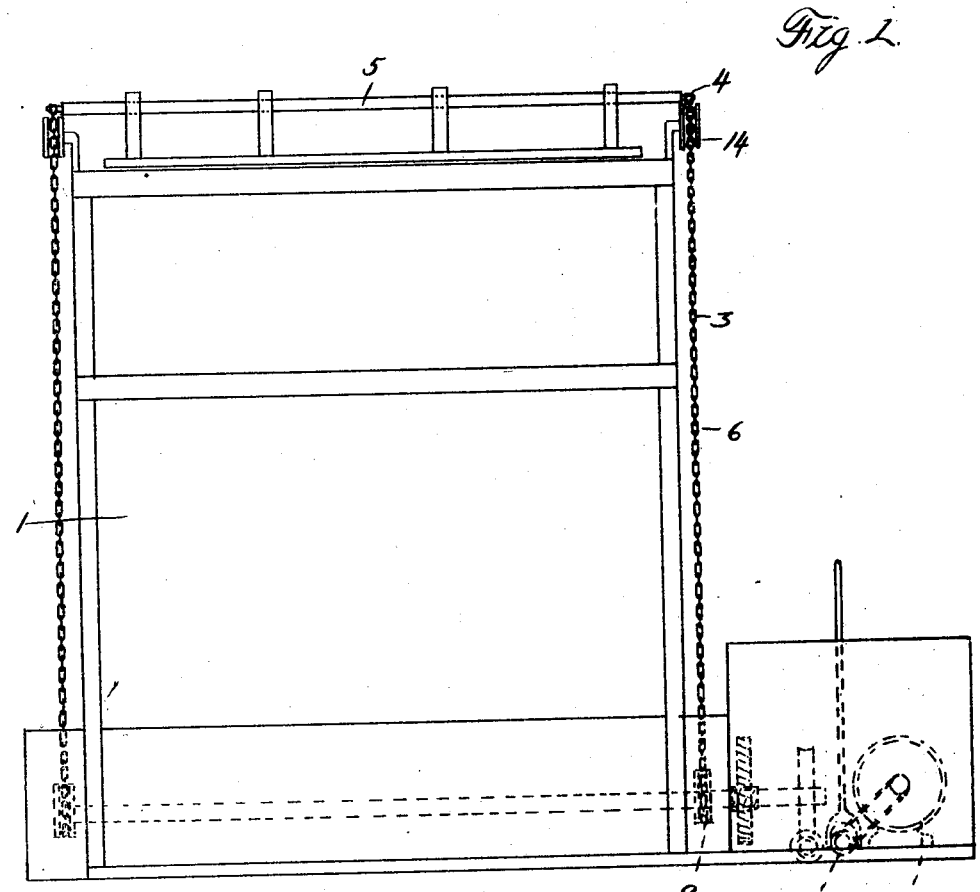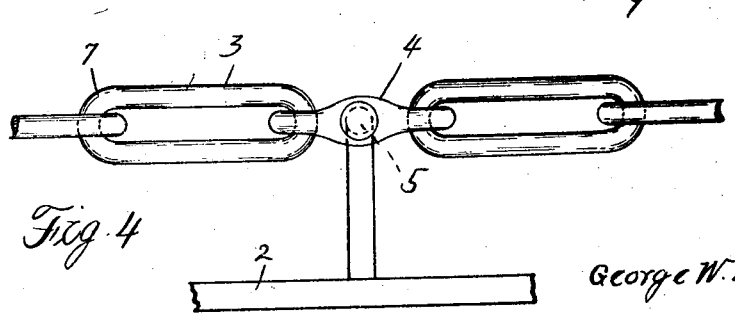

1,687,219

UNITED STATES PATENT OFFICE.

GEORGE W. LANGFORD, OF ANN ARBOR, MICHIGAN, ASSIGNOR TO ECONOMY BALER COMPANY, OF ANN ARBOR, MICHIGAN, A CORPORATION OF MICHIGAN.

BALING PRESS.

Application filed April 5, 1923. Serial No. 630,079.

The invention relates to baling presses and refers particularly to the power driven type, having a plunger movable laterally beyond the open upper end of the baling chamber to permit of inserting the material into the baling chamber. One of the objects of the invention is the provision of a chain operatively connected to the plunger and having a vertically extending portion, a laterally extending portion, and an inclined portion connecting the vertically and laterally extending portions, a drive wheel at the lower end of the baling chamber around which the connecting vertically extending and inclined portions of the chain pass, an idler wheel at the upper end of the baling chamber for guiding the connecting ends of the vertically and laterally extending portions, and other means at the upper end of the baling chamber for guiding the connecting ends of the vertically and laterally extending portions. Other objects of the invention reside in the novel features of construction and combinations and arrangements of parts as more fully hereinafter set forth.

In the drawings:

Figure 1 is a side elevation of a baling press embodying my invention;

Figure 2 is an end view thereof with the drive mechanism omitted;

Figure 3 is a similar view of a modified construction of baling press.

Figure 4 is a detail view of a portion of the chain.

1 is the baling chamber of the baling press having an open upper end through which the material may be inserted. 2 is the plunger movable vertically within the baling chamber and laterally beyond its upper end, and 3 is a continuous chain at each end of the baling press operatively connected to the plunger 2 for operating the same. This connection consists of blocks 4 in which opposite ends of the cross bar 5 carrying the plunger are rotatably mounted. Each block is apertured at its ends for engagement by adjacent links of the chain and as a consequence each block constitutes a link of the chain.

Each chain comprises the vertically extending portion 6 extending vertically and centrally at an end of the baling chamber, the laterally extending portion 7 located above the upper end of the baling chamber and extending from the upper end of the vertically extending portion to one side of the baling chamber, and the inclined portion 8 connecting the outer and lower ends respectively of the laterally and vertically extending portions 7 and 6, the arrangement being such that the plunger is raised vertically within the baling chamber and beyond its upper end and then laterally moved outward to clear the upper end, the plunger always remaining in substantially horizontal position so that the minimum amount of clearance above the baling chamber is required.

As shown in Figure 2 particularly, the chains at the opposite ends of the baling chamber are driven from the pocket wheels 9 at the lower end thereof, the connecting ends of the vertically extending and inclined portions of the chain passing around the drive pocket wheels. These pocket wheels are driven from a motor 10 through suitable drive mechanism 11. 12 are idler pocket wheels mounted upon the brackets 13 at the upper end of the baling chamber, the connecting ends of the laterally extending and inclined portions of the chains passing around these idler pocket wheels. 14 are other idler pocket wheels at the upper end of the baling chamber and around which the connecting ends of the vertically extending and laterally extending portions of the respective chains pass. With this arrangement, the prime mover for operating the plunger is located at the lower end of the baling chamber as are also the drive pocket wheels, thereby simplifying the construction and at the same time forming a direct drive for moving the plunger vertically downward within the baling chamber to compress the material within the baling chamber, at which time the maximum power is required. Also, the idler pocket wheels 14 function as guides for the vertically extending and laterally extending portions of the chains.

As shown in the modified construction in Figure 3, the baling press has the same general arrangement of parts with the exception that curved tracks 15 are used at the upper end of the baling chamber and over which the connecting ends of the vertically extending and laterally extending portions of the chains pass. Also, the idler wheels 16 are at a greater height than the idler wheels 12 in the first-mentioned construction to decrease the friction of the chains passing over the guides or tracks 15.

From the above description it will be readily seen that I have provided a baling press having a vertically extending baling chamber with an open upper end and also having a plunger movable within the baling chamber and laterally beyond its upper end, this plunger remaining substantially horizontal at all times, whereby the minimum clearance is required above the baling chamber. Also, that the plunger is operated by chains driven from pocket wheels at the lower end of the baling press, these chains passing over idler pocket wheels located laterally beyond the upper end of the baling chamber and over guides also located at the upper end of the baling chamber for directing portions of the chains longitudinally of the baling chamber. Furthermore, that the members pivotally carrying the plunger form links in the chains.

What I claim as my invention is:

1. In a baling press, the combination with a baling chamber having an open end, of a plunger movable longitudinally within said chamber and transversely of its open end and adapted to remain in a substantially horizontal position at all times, and means for moving said plunger to its different positions.

2. In a baling press, the combination with a baling chamber having an open end, of a plunger movable longitudinally in said chamber and transversely of its open end, and means for moving said plunger while maintaining the face thereof in parallel planes throughout its entire course of movement.

In testimony whereof I affix my signature.

GEORGE W. LANGFORD.